United States Patent [19]

Barber

[11] Patent Number: 5,046,701
[45] Date of Patent: Sep. 10, 1991

[54] MOLDED BALL/SEAL

[75] Inventor: Michael Barber, 1183 Garden Rd., Mississauga, Ontario, Canada

[73] Assignee: CTS Corporation, Ind.

[21] Appl. No.: 431,507

[22] Filed: Nov. 3, 1989

[51] Int. Cl.⁵ ............................................. F16K 31/06
[52] U.S. Cl. ............................ 251/129.02; 251/129.17; 251/368
[58] Field of Search ............... 251/129.17, 129.02, 251/368

[56] References Cited

U.S. PATENT DOCUMENTS

| 3,245,651 | 4/1966 | Erickson | 251/129.17 |
| 3,424,429 | 1/1969 | Monnich | 251/129.17 |
| 4,098,581 | 7/1978 | Kraft et al. | 251/368 X |
| 4,312,380 | 1/1982 | Leiber et al. | |
| 4,585,176 | 4/1986 | Kubach et al. | |
| 4,711,269 | 12/1987 | Sule | |

FOREIGN PATENT DOCUMENTS

| 1025692 | 3/1958 | Fed. Rep. of Germany | 251/129.17 |
| 1336541 | 7/1963 | France | 251/129.17 |

Primary Examiner—Arnold Rosenthal
Attorney, Agent, or Firm—Albert W. Watkins

[57] ABSTRACT

A solenoid valve includes a flexible diaphragm and ball to control hydraulic or pneumatic fluid flow. The diaphragm provides an essential part of a complete seal which prevents contaminants from adversely affecting operation of the valve. The diaphragm and ball are formed into a single impervious integral structure. The valve additionally includes a series of radially arranged flutes which surround the armature to allow movement of entrapped fluids within the valve so as to enable more rapid actuation of the valve, and also a conical end structure within the armature for similar improvement.

5 Claims, 5 Drawing Sheets

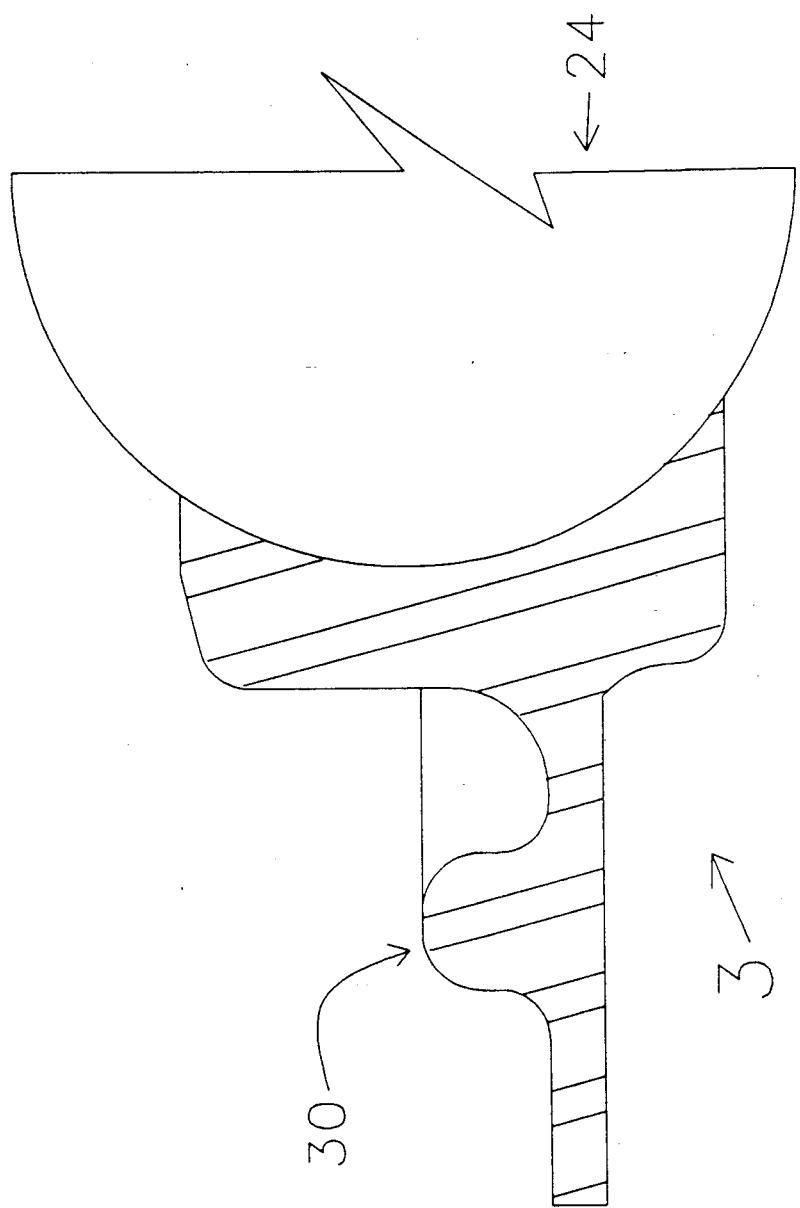

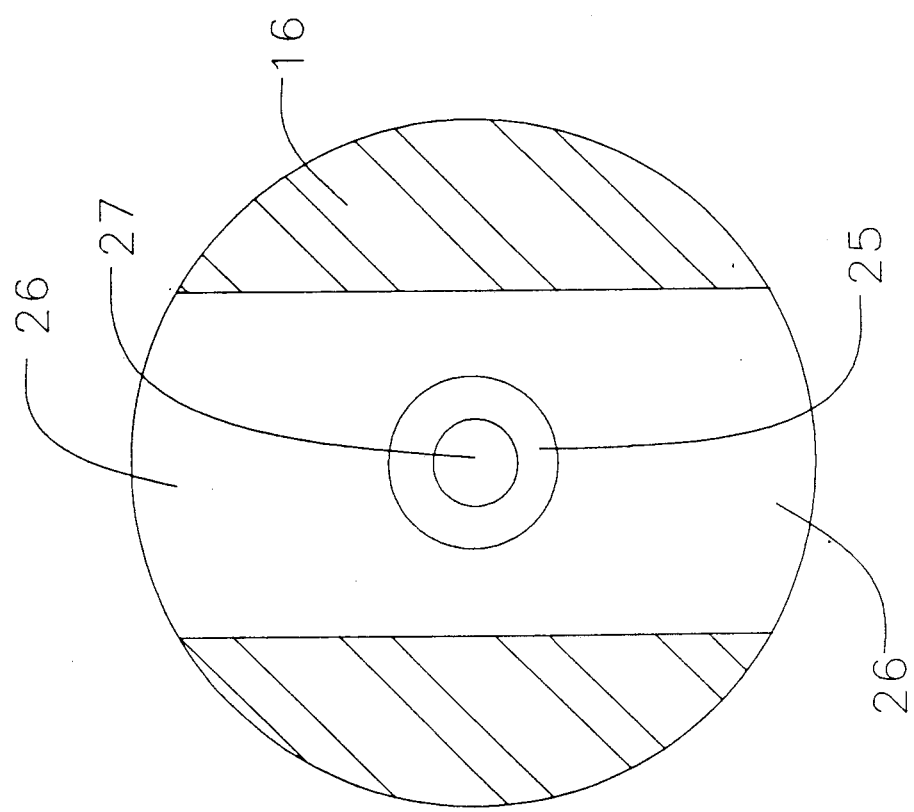

MOLDED BALL/SEAL

BACKGROUND OF THE INVENTION

1. Field of the Invention

This invention relates to hydraulic valves generally, and specifically to valves having sealed armatures.

2. Description of the Related Art

Hydraulic valves of the type which would be suitable for use in automatic transmissions and the like have historically been plagued by failures related to contaminants present in the transmission fluid. These contaminants generally include small metal filings and particles, some of which are produced during manufacture of the transmission and some which are a result of wear which occurs during operation. These contaminants enter the valve together with the fluid, and therein they can cause untold damage through several different mechanisms.

The first mechanism by which contaminants may cause damage is directly through contact with the valve closing apparatus. This could be a needle and valve seat in a needle type valve or a ball and valve seat where a ball type valve is used. If contaminants are present when the closing apparatus moves towards contact with the valve seat, premature contact occurs between the closing apparatus, contaminant, and valve seat causing leakage. Further motion causes destructive friction to occur. Repetitive motion combined with destructive friction will lead to a gradual wearing of the valve seat and valve closing apparatus, further adding to the initial contamination problem and further leakage. Eventually either the valve seat or closing apparatus will become sufficiently deformed so as to prevent complete closing of the valve and the valve will fail.

A second mechanism by which contaminants cause damage is more dependent upon the electromagnetic design of the system, as well as the mechanical configuration. In a system where ferromagnetic particles such as iron filings are likely to be present, the particles are readily attracted to the magnetic field used to activate the hydraulic valve. In the typical case of a transmission valve which is immersed in hydraulic fluid, the valve will act like a magnetic filter, attracting and retaining the ferromagnetic particles within the valve structure. The second mechanism, magnetic attraction, can result in failure of the valve simply by an eventual clogging of the valve by the gradually accumulating ferromagnetic contaminants. Where the valve is closed by a magnetic rod or ball seating directly upon the valve seat, the first type of wear mechanism described above is only worsened by the continued attraction of the contaminants to the magnetic closing apparatus.

Prior art patents have attempted to overcome many of the difficulties introduced by naturally prevalent contaminants. This attempt has been motivated by product warranties which are continually being extended, necessitating components which have ever increasing life expectancies. Some examples of these attempts are illustrated in U.S. Pat. No. 4,711,269 to Sule, U.S. Pat. No. 4,585,176 to Kubach et al, and U.S. Pat. No. 4,312,380 to Leiber et al, the foregoing patents incorporated herein by reference.

U.S. Pat. No. 4,312,380 to Leiber et al disclose in FIG. 1 a sealed valve arrangement designed for application in an antilock braking system. In order to overcome infiltration problems, Leiber et al utilized a dual chamber to restrict flow of fluid containing ferromagnetic materials to the region occupied by the electromagnet. However, in so doing, they have only further complicated the problems of a standard valve and additionally created new problems.

First, the Leiber et al disclosure has not solved any problems associated with wear occurring at the valve seat. Second, the Leiber et al disclosure has introduced an additional fluid flow path, around auxiliary push rod 15. This additional fluid flow path is subject to the same problems associated with contaminants as the closing apparatus (i.e.- wear during motion and ferromagnetic attraction of contaminants). While the Leiber et al disclosure has addressed the problem and has attempted to isolate the electromagnet from exposure to the contaminants, the addition of the extra components present greater possibility for contamination associated difficulties than the original basic design, while costing substantially more to manufacture. Particularly, clearances required for proper movement of the auxiliary rod are rapidly lost during repetitive movement of the auxiliary rod. Eventually, after relatively few actuations, the auxiliary rod will jam, resulting in valve failure. Further, the seal formed between the actuator and diaphragm is far from hermetic, being of a pressure fit variety.

The electromagnetic valve in U.S. Pat. No. 4,585,176 is disclosed as having application in fuel injection systems. In this patent grant to Kubach et al, there is disclosed a ball and diaphragm combination which is utilized to control flow of fluid through the valve. In the Kubach disclosure, fluid passes through ports in the valve to pass from one side of the diaphragm to the opposite side, past the valve seat, and out of the valve. In this disclosure, there is no seal created by the ball and diaphragm combination, but rather the diaphragm is used to apply a return spring force to the ball when the electromagnet is not actuated. In this disclosure, the ball is a ferromagnetic ball which would only serve to attract and trap ferromagnetic particles which will then accelerate the wearing of the device.

U.S. Pat. No. 4,711,269 to Sule et al discloses a sealed type valve for use in hydraulic and pneumatic valves. Described therein are other prior art techniques for accomplishing sealing. The prior art described, as well as incorporated into the Sule disclosure, utilize a flexible sealing diaphragm. This same diaphragm acts as the closing apparatus for the valve. While this technique certainly prevents destruction of the valve due to contamination of the electromagnet by ferromagnetic contaminants in the fluid, the design suffers severely from the first type of wear associated with destructive friction occurring at the valve seat. This destructive friction occurs because the valve closing apparatus must be flexible in nature. The material which is flexible is by its very nature not as wear resistant as other less flexible materials. Additionally, the complexity of the seals and the increased problems associated with internal misalignment do not add to the desirability o this design.

SUMMARY OF THE INVENTION

The present invention is comprised by an apparatus for controlling fluid passage having an actuator for selectively applying or failing to apply a force to a closing apparatus, a closing apparatus having a flexible impervious diaphragm which is formed about a more wear resistant less flexible interengaging device such as a glass ball suitable for engaging a valve seat, and associated structure to isolate said actuator from said controlled fluid. The resultant structure has greatly reduced wear which would result from contaminants in the controlled fluid. In the case where an electromagnetic actuator is utilized, there are additionally provided flutes in the chamber surrounding the armature, and the armature is designed to have a conical end portion to enhance performance of the electromagnetic actuator.

OBJECTS OF THE INVENTION

The primary objects of the invention are to provide a valve which is completely sealed against contamination of the electromagnet and which simultaneously provides long reliable life at the valve seat.

BRIEF DESCRIPTION OF THE DRAWINGS

FIG. 4 illustrates an enlarged half-sectional view of the ball/diaphragm combination.

FIG. 5 illustrates a cross-sectional view of the fluid pathway within the valve body.

DESCRIPTION OF THE PREFERRED EMBODIMENT

For the purposes of this disclosure, fluid is herein defined as "Any material or substance that changes shape or direction uniformly in response to an external force imposed upon it." The definition applies not only to liquids, but to gases and to finely divided solids. Hydraulic fluid shall herein be defined to include any fluid which is used to exert or transfer pressure.

Figure 1:
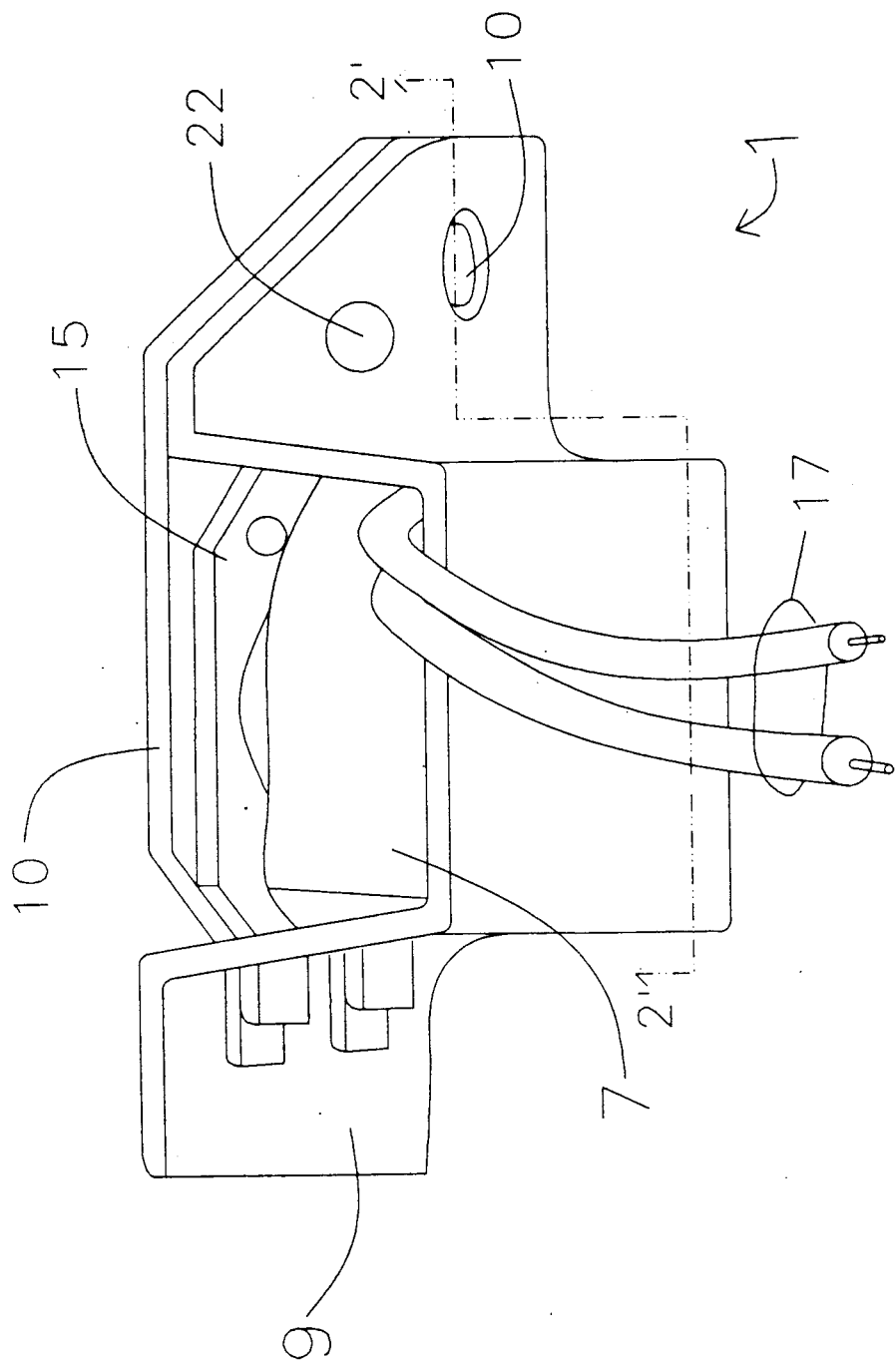
FIG. 1 illustrates the valve of the preferred embodiment of the present invention from a projected view.

In FIG. 1 there is illustrated from a projected view a valve 1 of the preferred embodiment of the present invention. Visible is an external mounting bracket 9 which may for example be bolted to some mounting surface by a bolt positioned through hole 10. Also illustrated are mounting plate 10, top plate 15, cover 7, projection weld 22, and wires 17. Wires 17 may additionally include electrical connectors (not illustrated).

Figure 2:
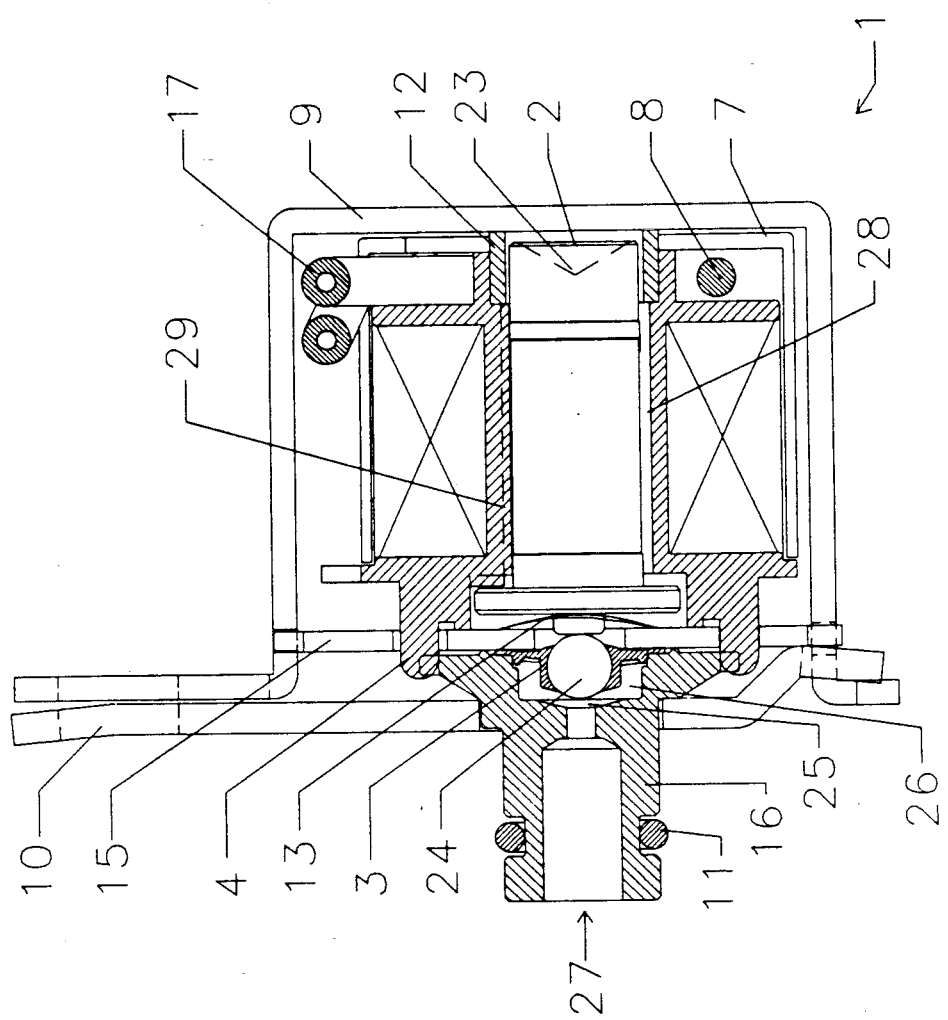
FIG. 2 illustrates the valve of the preferred embodiment of the present invention in an open position.

FIG. 2 is a cross-sectional view taken along section lines 2' of FIG. 1. In this illustration valve 1 is shown in an open position. The valve is positionally supported by mounting bracket 9, mounting plate 10, valve body 16, and O-ring 11. Top plate 15 is designed to interconnect with mounting bracket 9 and mounting plate 10 to complete the magnetic circuit and provide added structural support. Top plate 15 additionally interacts with other internal structure to be detailed hereinbelow. Valve body 16 and O-ring 11 are designed to be mateable with an appropriate hydraulic receptacles of known design. Armature 2 and wound bobbin 4 are magnetically coupled so as to provide force for the closing of the valve. As noted in the present figure, the valve is in the open state. Therefore, the bobbin 4 is not electrically energized. Additionally, armature 2 has at the end opposite the valve body 16 a conical contour 23. The use of a flat surface at this end has been found to be detrimental in that when bobbin 4 is energized, the armature tends to stick towards mounting bracket 9. Conical surface 23 has been found to relieve the tendency toward sticking. Ring 12 interengages mounting bracket 9, bobbin 4, and cover 7 so as to provide a relative seal therebetween.

Return force to open valve 1 when bobbin 4 is not energized is provided for by spring washer 13 which is designed to fit over one end of armature 2 and press against top plate 15. In the non-energized state illustrated, diaphragm 3 is sealed by pressure fit or other known means between top plate 15 and valve body 16. Hydraulic fluid is free to pass in through opening 27 in valve body 16 towards ball 24. Once the fluid passes valve seat 25, it then passes out through openings 26. Openings 26 extend entirely through the valve body to the exterior, such that fluid passing therethrough will be freely released to the valve surroundings and will require a sump to collect the fluid for reuse. Armature 2 additionally is proximal to ball 24 such that when bobbin 4 is energized, force is exerted against the spring force of spring washer 13 and any elastic force of diaphragm 3 to force ball 24 towards engagement with valve seat 25.

Figure 3:
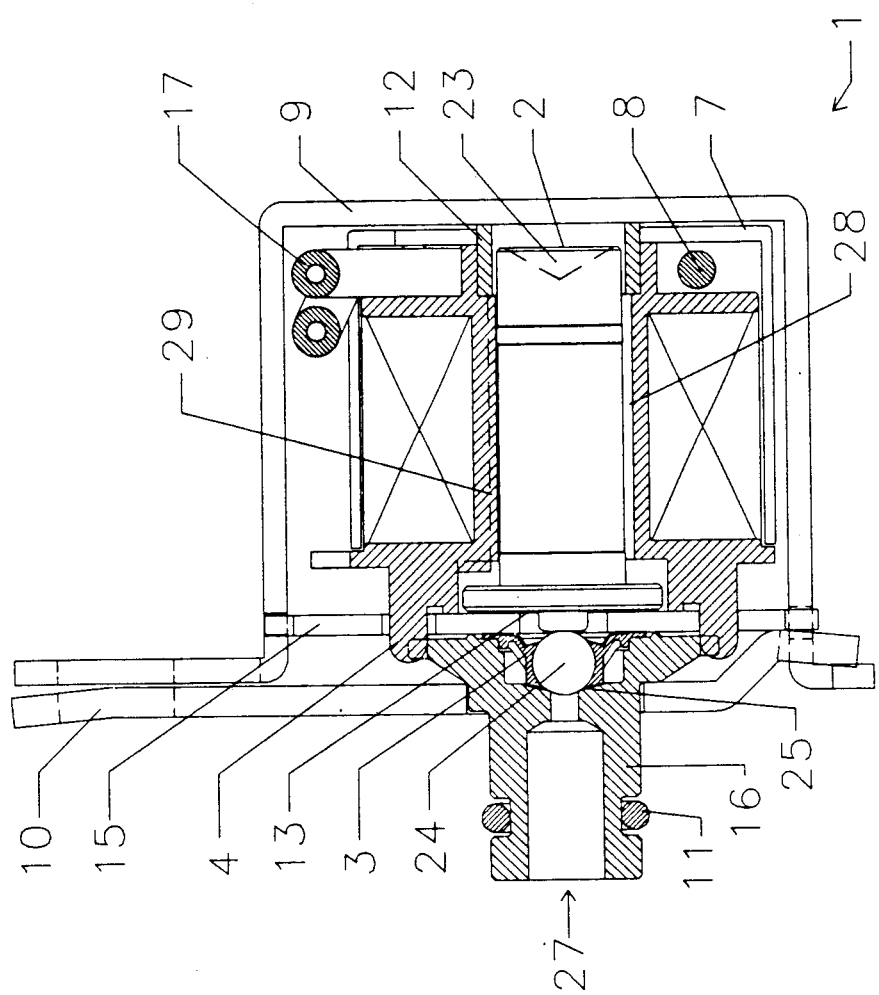
FIG. 3 illustrates the valve of the preferred embodiment of the present invention in a closed position.

The energized position is best illustrated in FIG. 3, wherein power is provided through conductors 17 and diode 8 in a known manner. Conductors 17 pass through an opening in cover 7 which may be sealed with a grommet in known manner if so desired. The inclusion of such is not essential to the invention and therefore has not been illustrated. All other features of like number operate in a like manner to those illustrated and described in reference to FIG. 2, the difference between FIGS. 2 and 3 specifically being the energization of bobbin 4 resulting in movement of armature 2, flexing of diaphragm 3, and seating of ball 24 against valve seat 25.

Significantly, movement of armature 2, when operating in a relatively sealed system, requires movement of the fluid (including air) surrounding armature 2. Were the bobbin 4 to have a perfectly cylindrical hole, as is common practice for unsealed systems, the movement of the surrounding fluid would be greatly impeded as there are no specific pathways designed therein. In the present invention flow of entrapped fluid is provided by a series of radially alternating flutes 29 and open areas 28 which surround armature 2. In this manner armature 2 is guided and positionally restrained by numerous flutes 29, while passages 28 allow for free flow of the entrapped fluid from conical end 23 to the opposite end and back as armature 2 moves in operation.

The ball 24 and seal 3 are illustrated in enlarged half-cross sectional view in FIG. 4. In the preferred embodiment, diaphragm 3 is integrally molded around ball 24. This may be accomplished through one of a variety of known molding techniques. Ball 24 is comprised of a non-magnetic material such as glass, which is both significantly harder than elastomeric materials to improve life expectancy and non-magnetic so as to prevent any accumulation of contaminants at the valve seat. The diaphragm 3 may be one of many well-known elastomers which is capable of being molded around the glass ball while simultaneously forming a seal with the ball. In the preferred embodiment fluorosilicone has been selected. Diaphragm 3 additionally has a protruding ring 30 which is provided to ease manufacturing of the valve 1. During manufacture a tiny integral diaphragm and ball could be very difficult to handle and position properly so as to ensure a satisfactory seal with top plate 15 and valve body 16. The addition of protruding ring 30 allows the diaphragm and ball to be placed by hand upon valve body 16 whereupon a slight deformation of protruding ring 30 will occur. This deformation serves to positionally retain the ball and diaphragm until such time as top plate 15 and valve body 16 are finally positioned. FIG. 5 illustrates the fluid passageway within the valve body, taken by cross-section looking along the axis formed by opening 27, looking from the general location of ball 24 towards the axial opening 27, with the ball 24 and diaphragm 3 removed from view. In this figure the openings 26 are more apparent than previously illustrated in either FIGS. 2 or 3.

While the foregoing details what is felt to be the preferred embodiment of the invention, no material limitations to the scope of the claimed invention is intended. Further, features and design alternatives which would be obvious to one of ordinary skill in the art are considered to be incorporated herein. One design alternative involves the collection of hydraulic fluid in a return line. While the preferred embodiment is heretofore disclosed, one of ordinary skill in the field would readily be able to adapt the design so as to fit a return line or even multiple lines as, for example, disclosed by Sule et al previously incorporated herein by reference. Additionally, the disclosure details a normally open valve. One of ordinary skill in the field could readily adapt the valve to a normally closed type valve. The scope of the present invention is set forth and particularly described in the claims hereinbelow.

I claim:

1. A valve for allowing passage of a fluid or alternatively blocking said passage comprising:

an actuator means for providing a first force to a closing apparatus, said first force having sufficient magnitude to overcome any opposing forces so as to alter the positioning of said closing apparatus, said actuator means being actuatable so as to either provide said first force or to fail to provide said first force;

said closing apparatus having a valve seat defining a fluid passage, a valve seat restricting means operable to close or highly restrict said fluid passage when said restricting means is immediately adjacent to said valve seat, a means for flexibly retaining said valve seat restricting means, said valve seat restricting means being of relatively less flexible composition than said retaining means;

said retaining means composed of a material which is formed using said valve seat restricting means as a part of a shaping mold such that said retaining means and said valve seat restricting means are bonded together so as to be impervious to passage of said fluid therethrough;

said closing apparatus having a means for providing a second force opposite to any first force which might be present when said actuator means is actuated to provide said first force;

said adjacency between said restricting means and said valve seat controlled by said provision or said failure to provide said first force.

2. The valve of claim 1 wherein said valve seat restricting means is composed of a non-magnetizable material.

3. The valve of claim 2 wherein said retaining means is composed of an elastomeric material, and wherein said valve seat restricting means is composed of a glass.

4. The valve of claim 2 wherein said valve seat restricting means is relatively spherical in shape.

5. The valve of claim 1 wherein said first force is generated electromagnetically.

* * * * *